(12) United States Patent  (10) Patent No.: US 9,223,314 B2
McClure et al.  (45) Date of Patent: Dec. 29, 2015

(54) HOVERING CONTROL FOR HELICOPTERS USING A GNSS VECTOR

(71) Applicant: AgJunction LLC, Hiawatha, KS (US)

(72) Inventors: John A. McClure, Scottsdale, AZ (US); Greg S. Guyette, Tempe, AZ (US)

(73) Assignee: Agjunction, LLC, Hiawatha, KS (US)

( * ) Notice: Subject to any disclaimer, the term of this patent is extended or adjusted under 35 U.S.C. 154(b) by 0 days.

(21) Appl. No.: 14/214,027

(22) Filed: Mar. 14, 2014

(65) Prior Publication Data
US 2015/0046077 A1  Feb. 12, 2015

Related U.S. Application Data

(60) Provisional application No. 61/781,510, filed on Mar. 14, 2013.

(51) Int. Cl.
G05D 1/02 (2006.01)
B64C 11/00 (2006.01)
G05D 1/08 (2006.01)

(52) U.S. Cl.
CPC ..................... G05D 1/0858 (2013.01)

(58) Field of Classification Search
USPC ........................................ 701/300; 244/17.13
See application file for complete search history.

(56) References Cited

U.S. PATENT DOCUMENTS

| | | | |
|---|---|---|---|
| 5,684,476 A | 11/1997 | Anderson | |
| 5,838,262 A * | 11/1998 | Kershner et al. | 340/945 |
| 6,720,913 B1 | 4/2004 | Schipper | |
| 8,014,909 B2 * | 9/2011 | Builta et al. | 701/7 |
| 8,139,108 B2 * | 3/2012 | Stratton et al. | 348/114 |
| 8,527,117 B2 * | 9/2013 | Block | 701/9 |
| 2006/0041845 A1 | 2/2006 | Ferguson et al. | |
| 2007/0032950 A1 | 2/2007 | O'Flanagan et al. | |
| 2011/0264307 A1 | 10/2011 | Guyette et al. | |
| 2011/0301784 A1 * | 12/2011 | Oakley et al. | 701/2 |
| 2012/0004793 A1 * | 1/2012 | Block | 701/9 |
| 2012/0068004 A1 * | 3/2012 | Hatamian | 244/17.13 |
| 2012/0133552 A1 | 5/2012 | Wu | |
| 2012/0162014 A1 | 6/2012 | Wu et al. | |
| 2012/0232717 A1 | 9/2012 | Koppie | |
| 2013/0079958 A1 | 3/2013 | Neri et al. | |
| 2013/0110347 A1 | 5/2013 | Ge | |
| 2013/0124082 A1 * | 5/2013 | Cho | 701/409 |
| 2013/0131980 A1 | 5/2013 | Ginsberg | |
| 2013/0166103 A1 | 6/2013 | Ko | |
| 2014/0119716 A1 | 5/2014 | Ohtomo et al. | |
| 2014/0122070 A1 | 5/2014 | Prus et al. | |
| 2014/0195150 A1 | 7/2014 | Rios | |

FOREIGN PATENT DOCUMENTS

AU 2002325645 3/2003

OTHER PUBLICATIONS

Trimble Navigation Limited, "AgGPS EZ-Steer Sales Brocure", http://www.trimble.com/Agriculture/, last accessed 2011, last updated Mar. 2010.

* cited by examiner

*Primary Examiner* — Thomas G Black
*Assistant Examiner* — Tyler Paige
(74) *Attorney, Agent, or Firm* — Law Office of Mark Brown, LLC; Mark E. Brown; Christopher M. DeBacker

(57) ABSTRACT

A GNSS-based system and method for maintaining a vehicle in a predetermined relation relative to a fixed location defined by GNSS coordinates. The system and method is configured for enabling and facilitating air-to-ground operations.

2 Claims, 1 Drawing Sheet

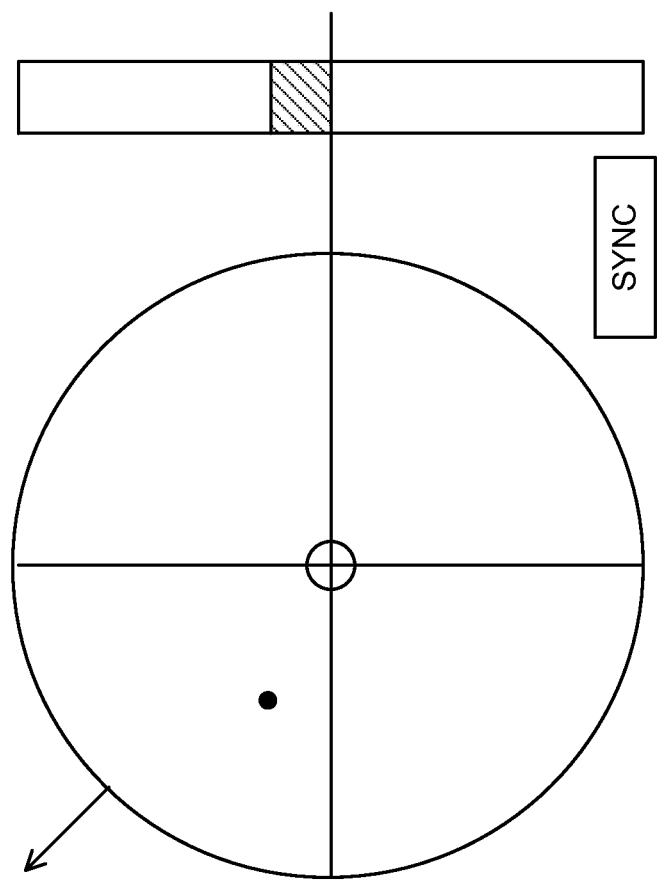

HOVERING CONTROL FOR HELICOPTERS USING A GNSS VECTOR

CROSS-REFERENCE TO RELATED APPLICATIONS

This application claims priority in and incorporates by reference U.S. provisional patent application Ser. No. 61/781, 510, filed Mar. 14, 2013.

BACKGROUND OF THE INVENTION

1. Field of the Invention

The present invention relates generally to a system and method for positioning control for vehicles, such as helicopters, using Global Navigation Satellite System (GNSS) vector guidance.

2. Description of the Related Art

Helicopters with winches are used in rescue operations, e.g., at sea for winching personnel off of heaving ships, rescues from cliff faces and in ravines for climbers and hikers. They are also used in lifting and positioning heavy objects in locations with limited accessibility. Examples include placing antennas on communications towers and placing heating, ventilating and air-conditioning (HVAC) equipment on rooftops, including high-rise buildings.

These operations are often carried out in less than ideal conditions, e.g.: at night; with low visibility; and in windy and rainy environments. These conditions make the positioning of the winch difficult to maintain during critical periods of the rescue or lift.

GNSS can effectively guide vehicles, such as helicopters, to work sites, but once speed is reduced the heading generated by GNSS is unreliable. Positioning discrepancies in connection with air-to-ground operations can also occur because winches are normally offset by several meters in X, Y and Z directions, which varies the desired winch position relative to the helicopter heading.

BRIEF SUMMARY OF THE INVENTION

The use of a GNSS Vector is proposed to help solve this problem, giving the ability to synchronize on a desired winch position and have a simple, intuitive, bubble guide to a pilot to enable maintaining a winch in a relatively constant position with varying wind and gust conditions and changes in the vehicle, such as a helicopter heading.

BRIEF DESCRIPTION OF THE DRAWINGS

The drawings constitute a part of this specification and include exemplary embodiments of the present invention illustrating various objects and features thereof.

FIG. 1 shows a representation of the display. Here the helicopter is pointing approximately 45 degrees. The synchronized position is to the left and slightly forward of the current position in the current heading attitude, the helicopter frame of reference, and the helicopter is slightly above the desired winch position.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

In the practice of an aspect of the present invention, a solution involves the application of the X, Y and Z shift to the master GNSS position of the GNSS Vector to give the location of the winch. Even using standard Satellite-Based Augmentation System (SBAS) corrections will give low drift during the 30 minutes or less normally required for the lift operation. The pilot guides the vehicle to a position where he or she wishes to maintain a lift attitude and activates the system, e.g., with a synchronization button.

The GNSS location, with the instantaneous Vector heading, is used to apply the X, Y, Z offset, which can be pre-programmed into the system. This then gives the position of the winch. The winch position is continuously updated using these parameters and the XY error display shown as a 2D level bubble. The bubble is dynamically rotated so that up is the helicopter forward heading. The XY drift of the winch position is shown as a shift in position of the bubble. The pilot only has to glance down to see the offset and adjust his position by flying towards the bubble to bring it to the center again. The bubble position in the circle is helicopter frame referenced, making it easy to correct the position with only a glance at the display.

The vertical display can be a vertical bar indicating distance from the synchronized position. The scale can be fixed, showing the error at the edge of the circle and/or dynamic with additional numerical displays.

It is to be understood that the invention can be embodied in various forms, and is not to be limited to the examples discussed above. The range of components and configurations which can be utilized in the practice of the present invention is virtually unlimited.

Having thus described the invention, what is claimed as new and desired to by secured by Letter Patent is:

1. A system for maintaining a vehicle in a predetermined relation with respect to a fixed location being defined by Global Navigation Satellite System (GNSS) coordinates, which system comprises:
   said vehicle including a winch having a chain hanging beneath said vehicle;
   a GNSS positioning device including a display mounted on the vehicle;
   said GNSS device display being configured to display a horizontal location of the vehicle relative to the fixed location;
   a GNSS-based altitude display connected to the GNSS device and configured to display an altitude of the vehicle relative to the fixed location;
   said GNSS device further configured to display a winch position corresponding with the end of said chain, whereby said winch position is based upon a preprogrammed three-dimensional offset from said position of said vehicle;

said GNSS-based altitude display comprising a two dimensional level bubble having a center point associated with said vehicle, a destination point associated with said fixed location, a heading directional arrow, and an axis;

said GNSS-based altitude display further comprising a vertical bar indicating distance of said vehicle away from a synchronized position directly over said winch position; and a vehicle control system connected to said GNSS positioning device and configured to placing and maintaining said vehicle into a predetermined relation with respect to said fixed location.

2. The system of claim 1, wherein said vehicle is a helicopter.

* * * * *